Figure 1:
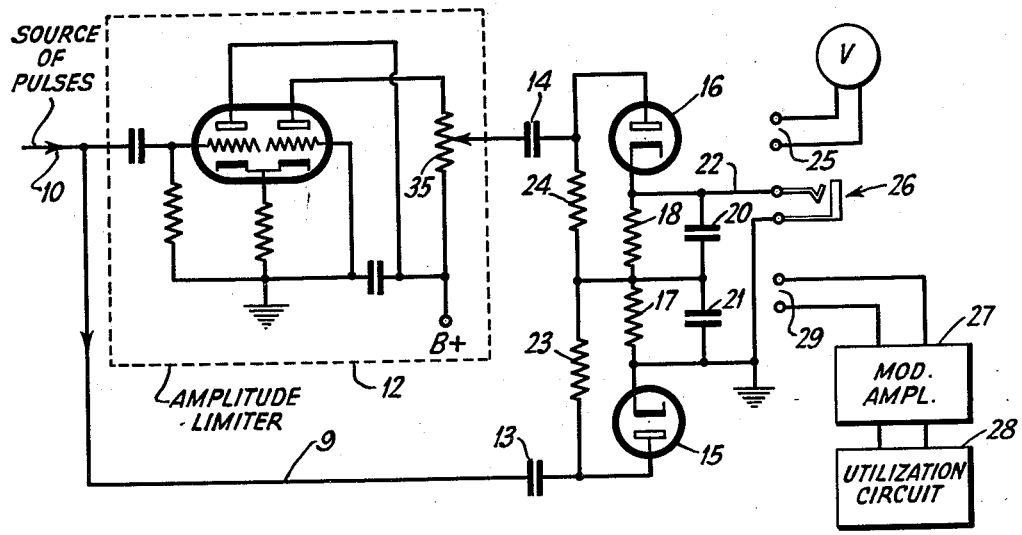

Feb. 6, 1951     M. G. CROSBY     2,540,512
INTERFERENCE REDUCING IMPULSE AMPLITUDE DETECTOR

Filed July 27, 1946

INVENTOR
MURRAY G. CROSBY
BY
ATTORNEY

Patented Feb. 6, 1951

2,540,512

UNITED STATES PATENT OFFICE 2,540,512

INTERFERENCE REDUCING IMPULSE AMPLITUDE DETECTOR

Murray G. Crosby, Montclair, N. J., assignor to Radio Corporation of America, a corporation of Delaware Application July 27, 1946, Serial No. 686,693

7 Claims. (Cl. 250—20)

This invention relates to the field of pulse detection, and more particularly, to the detection of pulses which are of short duration compared to the time intervals between them and which pulses have an amplitude variation which it is desired to detect or indicate.

An object of the invention is to enable the detection of the amplitude modulation of short duration pulses which are amplitude modulated, irrespective of the presence of other types of modulations simultaneously present on the same pulses.

Another object is to provide a peak voltage indicator of short duration pulses, whose indication is independent of the pulse repetition rate.

The present invention is applicable to a system utilizing a source of pulses which are of short duration compared to the time intervals between them. These pulses are amplitude modulated and may have impressed upon them other modulations, such as pulse frequency or repetition rate, pulse phase, pulse width or pulse number modulation. If the invention is utilized in a communications receiver, the source of pulses would be a suitable receiving system for receiving the pulses transmitted from a remote transmitter. If the invention is employed as a peak voltage indicator, the source of pulses may be a signal generator. The pulses applied to the apparatus of the invention may be either pulses of radio-frequency energy or direct-current pulses. In the system of the invention, the pulses are limited in a suitable amplitude limiter and the resultant limited pulses applied to a detector, such as a diode, for example, whose output comprises the average voltage of the detected pulses.

This average output voltage is independent of the amplitude of the applied pulses and dependent solely on the repetition rate of the pulses or other modulation distinct from the amplitude modulation of the applied pulses. Coupled to the source of pulses over a path devoid of any amplitude limiting circuit is apparatus for producing an output which is proportional to both the variations in amplitude and also proportional to the other types of modulation present on the pulses. A circuit is connected from the first detector which provides an average output voltage which is independent of the amplitude, to a point on the other detector circuit which provides an output proportional to both the variations in amplitude and variations in other modulation, such that the final output from the system as a whole is a voltage whose indication is dependent solely on the amplitude of the applied pulses.

One embodiment of the invention comprises a pair of detectors, one of whose inputs is connected to the source of pulses through an amplitude limiter and the other of whose inputs is connected directly to the source of applied pulses. Both of these detectors are so connected as to provide a voltage differential between the two detector outputs. This voltage differential is dependent solely on the pulse amplitude of the applied pulses and may be fed to a suitable voltmeter or, where the invention is used in connection with a signal receiving system, fed to a modulation amplifier and then to a utilization circuit. This utilization circuit may be a loudspeaker, a recorder or facsimile apparatus.

Another embodiment of the invention employs a pair of detectors one of whose inputs is connected to the source of pulses through an amplitude limiter and the other of whose inputs is connected to the source of pulses through a control amplifier. This control amplifier is responsive to and under the control of the output of the first detector which is fed by the limiter. Since the output of this first detector is independent of amplitude variations, it will be evident that the gain of the control amplifier varies in accordance with the modulations on the pulses which are distinct from the amplitude variations. Putting it in other words, a sort of AVC (automatic volume control) action is utilized to obtain a final output which is dependent solely on the amplitude modulation and not on any other type of modulation.

Figure 2:
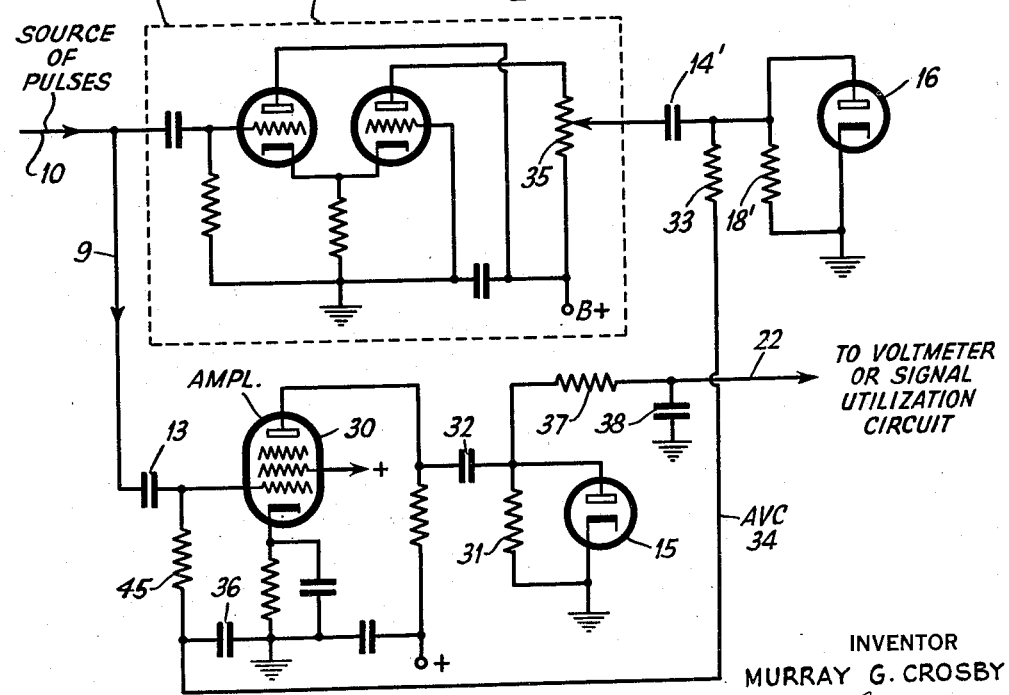

A more detailed description of the invention follows in conjunction with a drawing wherein:

Figs. 1 and 2 illustrate the two different embodiments of the present invention.

Throughout the two figures of the drawing, the same parts are represented by the same reference numerals.

Referring to Fig. 1 in more detail, there is shown a lead 10 to which are applied the pulses to be detected. These pulses may be D. C. pulses or pulses of radio frequency energy. They are preferably relatively short compared to the time intervals between them. It is assumed that these pulses are amplitude modulated and have other modulations impressed thereon, for example, pulse repetition rate, pulse phase, pulse width or pulse number modulation, and it is desired to detect solely the pulse amplitude modulation.

Coupled to the lead 10 is an amplitude limiter 12 shown within the dotted line box. This amplitude limiter is illustrative of any suitable limiter for achieving the desired results, and is illustrated as a pair of vacuum tube electrode structures whose cathodes are directly connected together and provided with a common cathode resistor. This particular amplitude limiter is a top and bottom limiter and is desribed in detail in my U. S. Patent #2,276,565, granted March 17, 1942. Output from the limiter 12 is passed through a coupling condenser 14 to the anode of a diode detector 16. This diode detector has in circuit with its cathode, a resistor 18 shunted by a condenser 20. Output is taken from the cathode of detector 16 via lead 22 and this output comprises an average voltage which is independent of the amplitude variations of the pulses in lead 10. Resistor 24 is merely a coupling resistor between the anode and cathode of the detector 16.

Directly coupled to the lead 10 via connection 9 and coupling condenser 13 is another diode detector 15. In circuit with the cathode of detector 15 is a resistor 17 and a condenser 21. The cathode of detector 15 is directly connected to ground as shown. Across the anode and cathode circuit of the detector 15 is a coupling resistor 23. The output from detector 15 is an average voltage which is proportional to both the variations in amplitude and also variations of other modulation present on the pulses in lead 10.

It should be noted that the anodes and cathodes of detectors 15 and 16 are respectively connected together through similar and correspondingly located circuit elements, as a result of which the outputs from both detectors 15 and 16 are differentially combined, or stated in other words, the output from detector 16 is subtracted from the output from detector 15. The resultant output is available in jack 26.

Another way of describing the principles of operation of the system of the invention is as follows:

If the pulses appearing in lead 10 have their amplitude and pulse rate modulated, and the peak voltage of the pulses is E and the repetition rate F, then the output from detector 16 may be represented as being proportional to the repetition rate F. The resultant output from the entire system will then be the difference between outputs of detectors 15 and 16, or E and F minus F equals E. It will be seen that the output of the system available at jack 26 is independent of the repetition rate and dependent solely upon the peak voltage of the applied pulses in lead 10. Where the invention is applied to a peak voltage indicator, then the voltmeter V which is connected to a plug diagrammatically represented by terminals 25, should be inserted into jack 26. This voltmeter, which may be a vacuum tube voltmeter, would indicate the peak voltage of the pulses in lead 10 independent of any modulation distinct from the amplitude modulation present in the pulses.

Where the invention is employed in a receiving system for receiving signal pulses, there is provided a modulation amplifier 27 whose input is coupled to a plug 29 and whose output is coupled to a suitable utilization circuit 28. Plug 29 should then be inserted in jack 26. The modulation amplifier may be an audio amplifier if the amplitude modulation on the pulses is of an audio character, or a supersonic frequency amplifier if the amplitude modulations on the pulses are of a supersonic frequency. The utilization circuit 28 may be headphones, a loudspeaker, a signal recorder, facsimile apparatus or any other suitable final output means.

In employing the system of Fig. 1, if the applied pulses appearing in lead 10 have a relatively slow repetition rate, then it is preferred that condenser 20 be of a relatively high value and shunt-connected resistor 18 also be very high in order that the average output from the detector 16 does not dissipate to an unusable low value. With this same assumption, condenser 21 and resistor 17 should also be relatively high. Stated otherwise, condensers 20 and 21 should be of large capacity for the particular case where the pulses are relatively widely separated. Where, however, the repetition rate of the pulses is very rapid, condensers 20 and 21 may be of a relatively low capacity and resistors 18 and 17 also be relatively low. Putting it in other words, the time constants or values of 18, 20, and 17, 21 are so chosen that the average output of the pulses is integrated over a period of time extending over several applied pulses.

Fig. 2 is a modification of the system of Fig. 1. In Fig. 2, the pulses in lead 10 are applied to the amplitude limiter 12 and then through a condenser 14' to the anode of detector 16. Condenser 14' is a coupling and a diode condenser while resistor 18' between the anode and cathode of detector 16 is a diode resistor. Pulses from lead 10 are also applied via lead 9 and a coupling condenser 13 to the control grid of a control vacuum tube amplifier 30 whose output is coupled via condenser 32 to the anode of detector 15. The condenser 32 serves both as a coupling and diode condenser. Resistor 31 between the anode and cathode of the detector 15 is a diode resistor.

It should be noted that the output of the detector 16 available across resistor 18' is fed through resistor 33 and AVC lead 34 to the control grid of the control amplifier 30 through another resistor 45. Resistor 33 and condenser 36 provide a time constant network. Hence, the output of detector 16 available in the AVC lead 34 is independent of amplitude variations of the pulses in lead 10 and is dependent solely on other modulations, such as the repetition rate, which occurs on the pulses and are distinct from the amplitude modulations. It will be evident that the gain of the control amplifier 30 varies in accordance with the variation in average output voltage of the detector 16. This variation in gain of the control amplifier 30 is in such direction as to eliminate or compensate for those variations in the pulses in lead 10 which are distinct from the amplitude variations, thus enabling the output from the amplifier 30 to be dependent solely upon the amplitude variations of the applied pulses. It may be said that the so-called AVC signal and the signals from the pulse source are differentially combined by the circuit by the resultant action on the tube current. The time constant circuit 33 and 36 has such values as to integrate the average variations of the modulation present in the output of detector 16. The output from detector 15 is a voltage whose average intensity is dependent solely on the peak voltage of the pulses in lead 10, other modulation having been compensated for. This average output is available in lead 22 which extends to suitable utilization apparatus such as a voltmeter or a suitable modulation amplifier in the same manner described above in connection with Fig. 1.

A time constant circuit 37, 38 coupled to lead 22 serves as a further integrating circuit and filter for removing the pulse frequency from the output on lead 22.

At this time, attention is invited to the potentiometer or balance control 35 in the output of amplitude limiter 12. This balance control is provided with a tap which feeds the detector 16. This tap is adjusted to a point on the balance control 35 so that voltage appearing in lead 22 is independent of modulations other than amplitude in the pulses. Unless the tap on balance control 35 is properly adjusted, it is possible to obtain too much or too little compensation for the other modulations present on the pulses which are distinct from the amplitude modulation.

The present invention finds particular application in signal receiving systems for receiving pulses upon which are impressed amplitude modulations and other modulations, and in which it is desired to separate the amplitude modulation of the pulses from other types of modulation. Other circuits different from the circuits of the invention may be employed to detect the other types of modulation which are distinct from the amplitude modulation. These circuits may contain limiters which remove the effects of the amplitude modulation upon the reception of these other types of modulation.

What is claimed is:

1. In a pulse system wherein pulses of short duration compared to the time intervals between them are transmitted, and such pulses contain amplitude variations and another type of modulation impressed upon them, means for detecting such pulse amplitude variations, comprising a source of pulses having amplitude variations, an amplitude limiter having an input coupled to said source, a detector coupled to the output of said limiter through a path essentially free of distortion, another detector coupled to said source through a circuit devoid of an amplitude limiter and essentially free of distortion, and means for differentially combining the outputs from both of said detectors.

2. In a pulse system wherein pulses of short duration compared to the time intervals between them are modulated in both amplitude and timing, means for detecting such pulse amplitude variations, comprising a source of pulses having varying occurrence times, means coupled to said source for obtaining an output proportional solely to the variations in occurrence time, separate means also coupled to said source through a path essentially free of frequency distortion for obtaining an output proportional to both the variations in amplitude and variations in occurrence time, and means for differentially combining the aforesaid outputs of said first and second means.

3. A system for detecting pulse amplitude variations of a source of pulses having varying occurrence time, comprising means coupled to said source for obtaining an output proportional solely to the variations in occurrence time, separate means also coupled to said source through a path essentially free of distortion for obtaining an output proportional to both the variations in amplitude and variations in occurrence time, and a circuit between the aforesaid output of said first means and said second means to differentially combine said outputs to produce a resultant output which is proportional to solely the amplitude variations of the applied pulses.

4. A system for detecting amplitude variations of short duration pulses having one or more other modulations impressed thereon, comprising means to which said pulses are applied for providing an output proportional solely to said other modulations, separate means to which said pulses also are applied through a path essentially free of frequency distortion for providing an output proportional to both the amplitude variations and other modulations, a circuit between the output of said first means and said second means so arranged as to differentially combine said outputs to produce a resultant output which is proportional to solely the amplitude variations of the applied pulses.

5. A system for detecting amplitude variations of applied pulses containing other variable characteristics, comprising a source of said pulses, a top and bottom amplitude limiter coupled to said source for removing an intermediate portion of the applied pulses, a diode detector having an anode coupled to said limiter through a condenser and over a path essentially free of distortion, an output resistor for said diode detector, another diode detector having an anode coupled to said source over a circuit devoid of an amplitude limiter and essentially free of distortion, an output resistor for said last detector, and means connecting said resistors to differentially combine the outputs from said detectors to produce an output which is dependent substantially solely upon the amplitude variations of the applied pulses.

6. A system for detecting pulse amplitude variations of a source of spaced pulses having varying occurrence time, comprising means coupled to said source for obtaining an output of spaced constant amplitude pulses which vary in occurrence time, separate means also coupled to said source through a path essentially free of frequency distortion for obtaining an output of spaced pulses which vary both in amplitude and in occurrence time, a circuit between the aforesaid output of said first means and said second means to differentially combine said outputs to produce a third output free of the variations in occurrence time and which is proportional to solely the amplitude variations of the applied pulses.

7. In a pulse communication system for receiving remotely spaced recurrent short duration pulses which are modulated in amplitude and in some other characteristic, a receiver for receiving said pulses, a first branch circuit coupled to said receiver and including an amplitude limiter followed by a detector so coupled to said limiter as to produce an output voltage which is independent of the amplitude of the pulses applied to the detector a second branch circuit having its input coupled in parallel with the input of said first branch circuit through a path essentially free of frequency distortion and comprising a detector producing an output essentially proportional to both types of modulation present on the received pulses, and means for differentially combining the outputs from both of said detectors.

MURRAY G. CROSBY.

REFERENCES CITED

The following references are of record in the file of this patent:

UNITED STATES PATENTS

| Number | Name | Date |
|---|---|---|
| 2,024,614 | Terry | Dec. 17, 1935 |
| 2,103,847 | Hansell | Dec. 28, 1937 |
| 2,276,565 | Crosby | Mar. 17, 1942 |
| 2,394,544 | Gottier | Feb. 12, 1946 |
| 2,397,840 | Crosby | Apr. 2, 1946 |
| 2,412,994 | Lehmann | Dec. 24, 1946 |
| 2,418,127 | Labin | Apr. 1, 1947 |